June 7, 1927.  
A. M. SCHICK  
1,631,698  
VEHICLE SIGNALING APPARATUS  
Filed Sept. 9, 1926  3 Sheets—Sheet 1
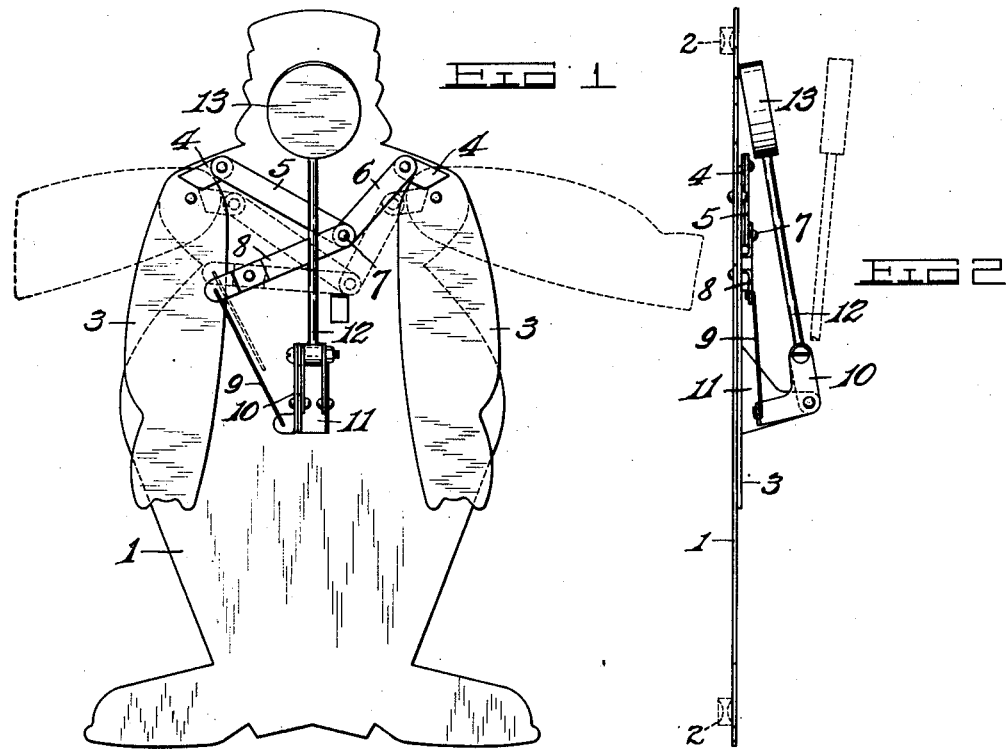
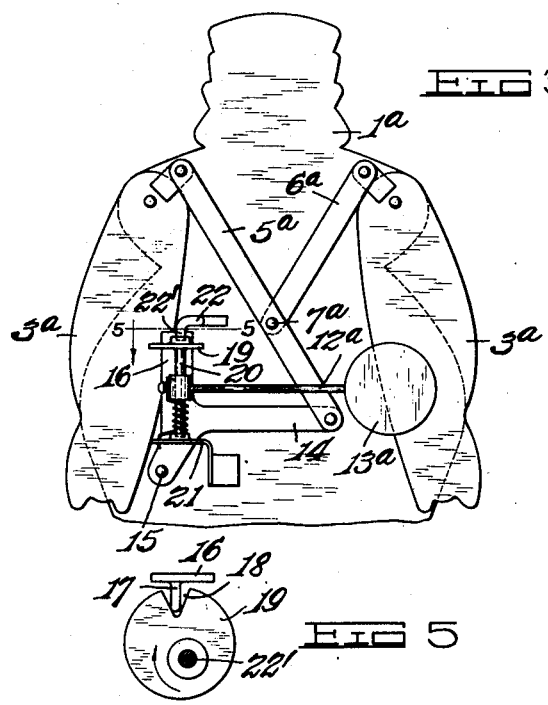
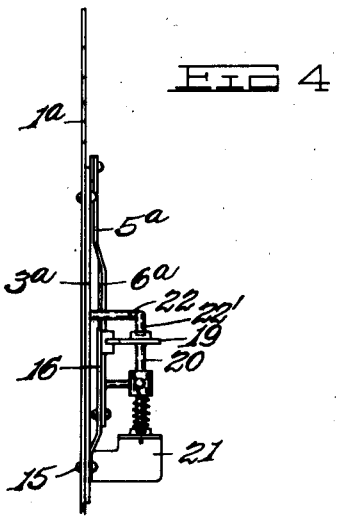
INVENTOR  
A. M. Schick  
BY  
ATTORNEY June 7, 1927.  A. M. SCHICK  1,631,698
VEHICLE SIGNALING APPARATUS
Filed Sept. 9, 1926   3 Sheets-Sheet 2
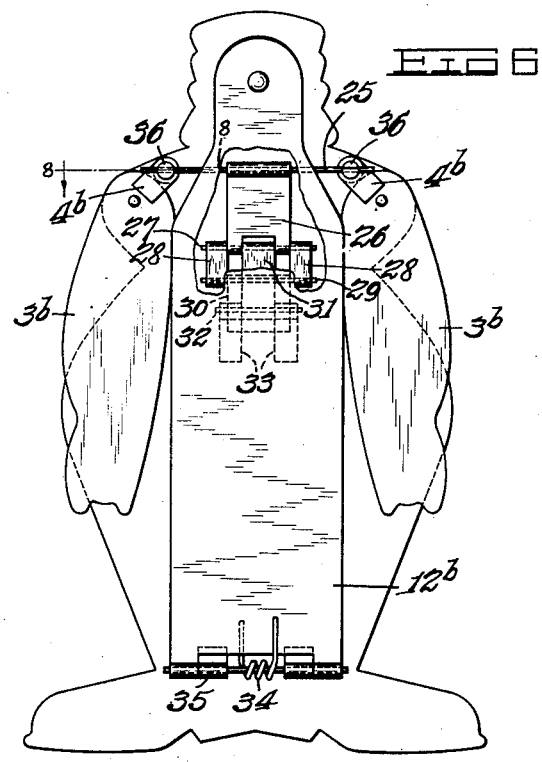
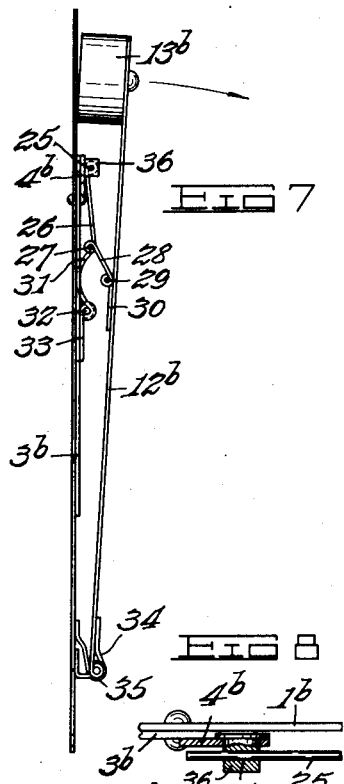
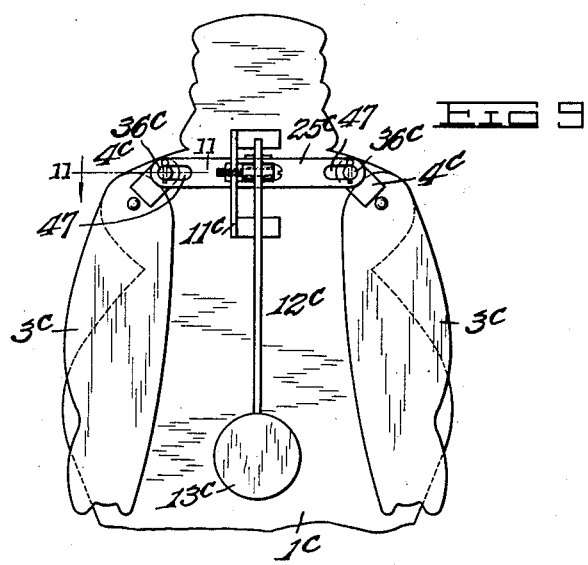
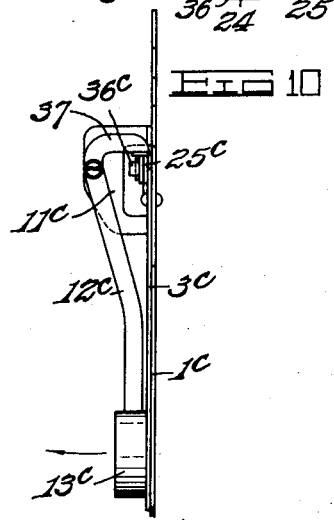
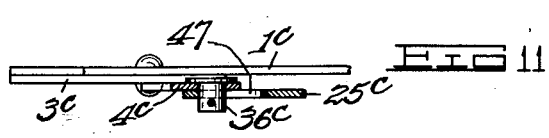
INVENTOR
A. M. Schick
BY N. E. Dunlap
ATTORNEY June 7, 1927.
A. M. SCHICK
1,631,698
VEHICLE SIGNALING APPARATUS
Filed Sept. 9, 1926   3 Sheets-Sheet 3
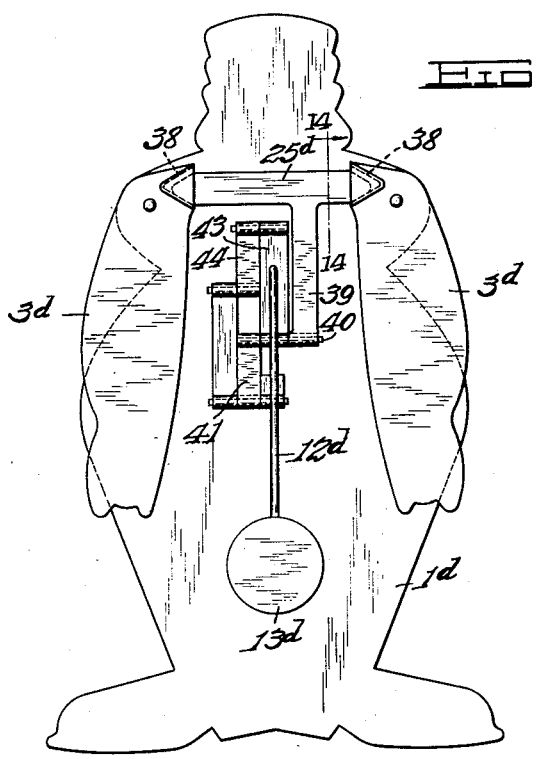
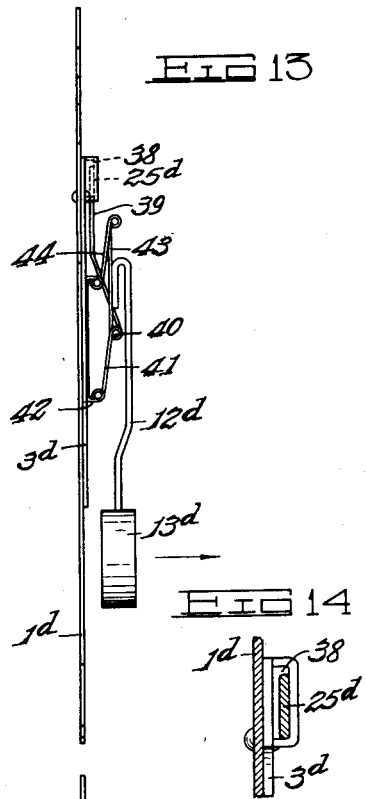
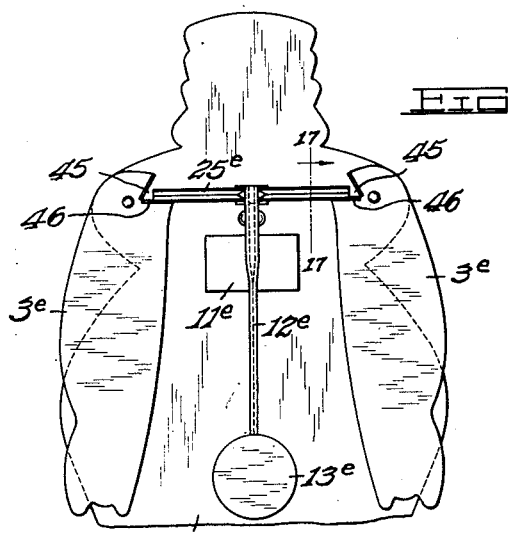
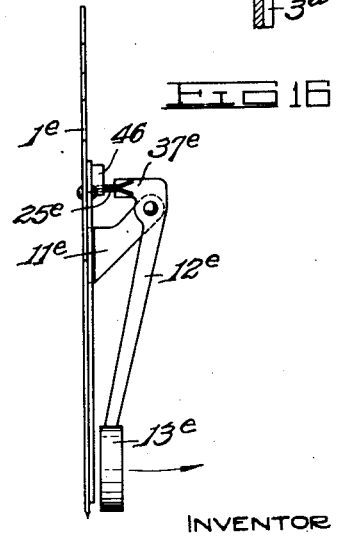
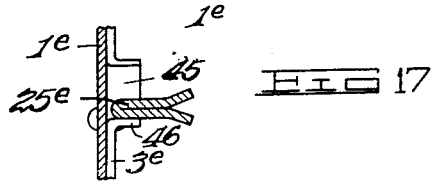
INVENTOR
A. M. Schick
BY N. E. Dunlap
ATTORNEY Patented June 7, 1927.

1,631,698

UNITED STATES PATENT OFFICE.

ADOLPH M. SCHICK, OF WHEELING, WEST VIRGINIA.

VEHICLE SIGNALING APPARATUS.

Application filed September 9, 1926. Serial No. 134,388.

This invention relates broadly to vehicle signaling apparatus, and it has for its primary object to provide a device adapted to be carried by a motor vehicle whereby may be automatically actuated a "slow down" or "stop" signal visible to drivers in the rear of such vehicle.

A further object is to provide a signaling device for vehicles embodying a semaphore and means adapted to be actuated by movements of the vehicle whereby said semaphore is shifted to and from signaling position for indicating the character of such movements.

With these and other important objects in view, the invention resides in the features of construction which will hereinafter be fully described, reference being had to the accompanying drawings, in which—

Figure 1 is a rear elevation of the invention;

Figure 2 is a side elevation of the same;

Figures 3 and 4 are, respectively, rear and side elevations of a modified form of the invention;

Figure 5 is an enlarged detail section on line 5—5, Fig. 3, showing the rotary cam and the therewith-engaged operating lever;

Figures 6 and 7 are, respectively, rear and side elevations of a second modified form;

Figure 8 is an enlarged detail section on line 8—8, Fig. 6;

Figures 9 and 10 are, respectively, rear and side elevations of a third modified form;

Figure 11 is an enlarged detail section on line 11—11, Fig. 9;

Figures 12 and 13 are, respectively, rear and side elevations of a fourth modified form;

Figure 14 is an enlarged detail section on line 14—14, Fig. 12;

Figures 15 and 16 are respectively, rear and side elevations of a fifth modified form; and—

Figure 17 is an enlarged detail section on line 17—17, Fig. 15.

Referring first to Figs. 1 and 2 of said drawings, 1 designates generally a body of flat plate form which may be made of any suitable stiff material, preferably sheet metal, and which may be rigidly mounted in any appropriate position upon the rear part of an automobile. While I have indicated in dotted lines in Fig. 2 a preferred form of support consisting of an ordinary form of rubber suction cup 2 attached to the face of said body and by means of which the invention may be mounted upon the inner surface of the stationary rear glass window of an automobile body, it is obvious that other means of support and various other locations may readily suggest themselves to mechanics and others. The location of the device on the rear body glass of the vehicle is considered appropriate, first, for the reason that it is at all times within the unobstructed range of vision of drivers of closely following cars; second; that it is shielded from the elements, and, third, that it cannot so readily be tampered with by unauthorized persons.

While the body 1 may be made of any other appropriate form, I have herein shown the same as having the outline of a grotesque figure of a man, as a police officer, thus to take advantage of the fact that movements of a more or less ludicrous character made by such figure will naturally attract and hold the attention of persons in position to observe them. The face of said body 1 may be, and preferably is, painted or lithographed to present the features and other adjuncts or appurtenances of a man, but such, forming no part of the invention, is not herein shown.

Pivotally attached to the body 1 on the rear face thereof is one or more semaphore arms 3 which are normally maintained by gravity in depending vertical positions. Said arms 3, as depicted in the embodiment shown in the drawings, are attached to the shoulder portions of the human figure represented. Each of said arms carries on, or has fixed to, the pivoted end thereof an upwardly and inwardly inclined lever-like arm 4, and pivotally attached to said lever arms are links 5 and 6 which are downwardly and convergently inclined and connected at their lower ends by a pivot pin 7, and mounted on said pivot pin is the upper end of a lever 8 which is pivoted intermediate its ends upon the body 1 and which has its opposite end connected by a pivoted link 9 to one arm of a bell crank lever 10. Said bell crank is pivoted intermediate the arms thereof upon a bracket 11 which is rigidly mounted upon said body 1, and the other arm thereof is directed upwardly and carries in rigid relation thereto an upstanding rod or arm 12 which is surmounted by a weight 13. Said weighted arm 12 normally occupies a rearwardly inclined position in which its weight 13 rests against the rear surface of the body 1, as shown in Fig. 2, and thus, through the intermediate link and lever mechanism hereinbefore described, the semaphore arms 3 are held in the depending positions shown in Fig. 1. However, when the velocity of the vehicle by which the described apparatus is carried is suddenly reduced, as when the service brake thereof is applied for slowing down or for stopping, the weighted arm 12 is by momentum carried forward, as to the dotted line position thereof shown in Fig. 2, thus effecting in an obvious manner, through the intermediate mechanism described, the outward swinging of the semaphore arms 3 to a substantially horizontal signaling position, as shown in dotted lines in Fig. 1. The force of gravity acting upon the semaphore arms and the associated parts of the mechanism serves to return the various elements of the mechanism to their normal positions either when the vehicle comes to a stop or when the resistance to momentum is overcome, as when the vehicle proceeds at a substantially even or increasing speed.

In the modified form of mechanism shown in Figs. 3 and 4, the lever 5ª has its lower end suitably prolonged downwardly from the point of its mounting on the pivot pin 7ª and pivotally connected to the outer end of a horizontal disposed lever 14 which is pivotally mounted, as at 15, on the body 1. Said lever 14 carries an upstanding arm 16 on its pivoted end, and carried upon the upper end of said arm is a rearwardly directed lug 17 which is received in a notch or recess 18 of V-shape provided in the peripheral edge portion of an eccentric disk 19 that is fixed on a vertically disposed rotary shaft 20.

The shaft 20 has its lower end journaled in or on a bracket 21 fixed on the body 1 in an appropriate position, and the thereto fixed eccentric disk 19 is pivotally associated with an arm 22′ of a bracket member 22 which is also fixed on said body 1, said arm 22′ being axially alined with said shaft, as shown. Fixed on said shaft 20 is an end of a horizontally disposed rod or arm 12ª which carries upon its opposite end a weight 13ª which normally occupies a rearwardly swung position in which the semaphore arms 3 are pendent. Upon a sudden reduction in the velocity of movement of the vehicle by which the apparatus is carried, the momentum swings the weighted arm 12ª forward, thus rotating the shaft 20 and disk 19, which movement acts through the lug-carrying arm 16 to swing the lever 14 downward for actuating the semaphore arms 3ª, through the thereto-attached links 5ª and 6ª, to swing to approximately horizontal positions.

In Figs. 6, 7 and 8, pivot-pins 36 loosely mounted in the lever arms 4ᵇ have therein transverse bores 24 through which are loosely directed the opposite end portions of a rod 25. Having pivotal connection at its upper end with said rod 25 intermediate the ends of the latter is a link 26 which carries at its lower end a horizontal pin 27 which has flexible link connection, as through links 28, a pivot pin 29 and a bracket 30, with an intermediate portion of a substantially upright shiftable plate or arm 12ᵇ, said bracket 30 being fixed to the last mentioned arm.

Also pivoted on said pin 27 is the upper end of an arcuately curved link 31 which is pivotally connected at its lower end with the body 1 through the intermediacy of a pin 32 and carrying brackets 33 borne by said body. The arm 12ᵇ is hinged at its lower end to the body 1 and carries upon its upper end a weight 13ᵇ. A light coil spring 34 associated with said arm, as at the hinge 35, serves normally to maintain said arm in the retracted position in which the weight 13ᵇ is seated with respect to the body 1, as shown in Fig. 7.

Upon a sudden reduction in the velocity of forward movement of the vehicle by which the apparatus is carried, the momentum acts to swing forward the weighted arm 12ᵇ, which movement, through the intermediacy of the links 28 and 26 draws the rod 25 downward and effects resultant swinging of the semaphore arms 3ᵇ to approximately horizontal positions.

Referring to Figs. 9, 10 and 11, the pivot pins 36ᶜ carried by the arms 4ᶜ are received in slots 47 provided longitudinally in the opposite end portions of a bar 25ᶜ. Seated upon the top of said bar is the end of a substantially horizontal arm or lever 37 which is formed integrally with and extends rearwardly from the upper end of a pendent rod or bar 12ᶜ which carries on its lower end a weight 13ᶜ. Said bar 12ᶜ is pivotally mounted on a bracket 11ᶜ carried by the body 1. Sudden reduction in the velocity of the vehicle which carries the described structure causes the weighted bar 12ᶜ to swing forward on its pivot and the lever 37 to depress the bar 25ᶜ, whereby the semaphore arms 3ᶜ are actuated to swing to elevated signaling positions.

In the modified structure illustrated in Figs. 12, 13 and 14, the arms 3ᵈ have triangular pockets 38 in the inner edge portions of their upper ends, formed by pressing forwardly triangular portions of the metal of said arms. Loosely received in said pockets are tapered opposite end portions of a bar 25ᵈ. Depending from an intermediate portion of said bar is an arm 39 which has its lower end pivoted upon a pin 40. Said pin also has pivoted thereon the upper end of a link 41 which inclines downwardly and rearwardly and is pivoted at its lower end to the body 1, as through the intermediacy of a bracket 42 carried by said body. Also pivoted on said pin 40 is the lower end of a substantially vertical link 43 which has its upper end pivoted to the upper end of a downwardly and rearwardly inclined link 44, similar to the link 41, which is pivotally attached at its lower end to the body 1. Fixed to the link 43 intermediate the ends of the latter is the upper end of a pendent rod 12$^d$ which carries a weight 13$^d$ on its lower end. The weighted arm 12$^d$ in its normal pendent position maintains the parts of the described structure in the positions shown in Figs. 12 and 13 wherein the semaphore arms 3$^d$ are pendent. When, however, the arm 12$^d$ swings forward, as upon a reduction in the velocity of the vehicle by which the mechanism is carried, the links 41 and 44 are thereby actuated to swing down to substantially horizontal positions, carrying therewith the arm 39 and bar 25$^d$, whereby said semaphore arms 3$^d$ are actuated to swing to their elevated signaling positions.

Referring, next, to the modified structure shown in Figs. 15, 16 and 17, which is designed to have all of the various parts thereof, except only the pivot pins and weight, made of cardboard, the semaphore arms 3$^e$ are provided with V-shaped recesses or notches 45 defined by forwardly turned flanges 46 upon the lowermost of which rest the opposite ends of a stiff bar 25$^e$ formed of doubled cardboard which has its outer edge portions engaged with an arm or lever 37$^e$ which is made integral with and extends rearwardly from the upper end of a pendent cardboard bar 12$^e$ which carries a weight 13$^e$ upon its lower end. Said bar 12$^e$ is pivotally mounted on a bracket 11$^e$ carried by the body 1. Sudden reduction of the speed of the vehicle causes said bar to swing forwardly for depressing the bar 25$^e$, whereby said semaphore arms 3$^e$ are elevated.

While the various semaphore actuating mechanisms hereinbefore described differ somewhat in the construction and arrangement of their parts, it will be noted that each involves devices whereby movements of a pivotally mounted weighted arm, maintained by gravity in a retracted position, are transmitted to semaphore arms for actuating the latter to and from a substantially horizontal signaling position; also that the weighted arm which operates through said mechanism is in each case actuated to move from its gravity held normal position by its own momentum upon a reduction in the velocity of the vehicle by which the apparatus is carried.

What is claimed is—

1. In a signaling device for vehicles, a body member adapted to be carried by a vehicle, a vertically movable semaphore arm pivotally mounted on said body, a weighted member pivoted on said body, and mechanism intermediate said weighted member and said arm whereby movement of the former actuates the latter to and from signaling position, said weighted member being adapted to be moved in one direction by momentum upon reduction in the velocity of movement of the vehicle.

2. In a signaling device for vehicles, a body member adapted to be carried by a vehicle, a semaphore arm pivotally mounted on said body, a weighted member pivoted on said body, and link and lever mechanism disposed intermediate said weighted member and said arm whereby movement of the former actuates the latter to and from signaling position, said weighted member being normally held by the force of gravity in a position maintaining said arm in non-signaling position and being adapted to move forward by momentum for actuating said arm to signaling position upon a reduction in the speed of the vehicle.

3. In a signal for vehicles, a body adapted to be stationarily carried by a vehicle, a semaphore signal pivotally mounted on said body, a member pivotally mounted on said body for direct forward and rearward swinging movements relative to the latter, and means operatively connecting said member to said semaphore whereby movements of the former are communicated to said semaphore for operating the latter to and from signaling position, said member being normally disposed in a predetermined position relative to said body and being shiftable from said position by reason of its own inertia upon retardation of the velocity of the vehicle.

4. In a signal for vehicles, a body adapted to be stationarily carried by a vehicle, a semaphore signal pivotally mounted on said body, a member pivotally mounted on said body for direct forward and rearward swinging movements relative to the latter, and link mechanism connecting said member to said semaphore whereby movements of said member relative to said body, due to its own inertia upon changes of speed of the vehicle, are communicated to said semaphore for elevating and lowering the latter.

5. In a signal for vehicles, a body adapted to be stationarily carried by a vehicle, a semaphore signal pivotally mounted on said body, a member pivotally mounted on said body for direct forward and rearward swinging movements relative to the latter, and link mechanism connecting said member to said semaphore whereby movement of said member from the normal position thereof relative to said body, due to inertia upon retardation of the velocity of the vehicle, is communicated to said semaphore for elevating the latter to signaling position.

6. A device of the character described comprising, in combination with a transparent window, a body simulating the human form suspended from said window, a pair of arms attached pivotally to said body, and suitably anchored means having connection with said arms whereby the latter may be rotated from the normally vertical position to the horizontal position.

7. A stop signal of the character described comprising a body simulating the human form adapted for mounting in an upright stationary position upon a vehicle, a pair of arms pivotally attached to said body and normally disposed in vertical position, and means controlled by retardation of the rate of speed of the vehicle whereby said arms are actuated to swing to horizontal position.

In testimony whereof, I affix my signature.

ADOLPH M. SCHICK.